United States Patent
Kanemitsu et al.

(10) Patent No.: US 9,106,853 B2
(45) Date of Patent: Aug. 11, 2015

(54) SOLID-STATE IMAGING DEVICE

(71) Applicant: Kabushiki Kaisha Toshiba, Minato-ku (JP)

(72) Inventors: Shiroshi Kanemitsu, Yokohama (JP); Hidetoshi Kono, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/175,029

(22) Filed: Feb. 7, 2014

(65) Prior Publication Data

US 2015/0109490 A1 Apr. 23, 2015

(30) Foreign Application Priority Data

Oct. 22, 2013 (JP) .................................. 2013-219463

(51) Int. Cl.
*H04N 5/359* (2011.01)
*H04N 5/217* (2011.01)
*H04N 5/374* (2011.01)
*H04N 5/3745* (2011.01)

(52) U.S. Cl.
CPC ........... *H04N 5/3595* (2013.01); *H04N 5/2175* (2013.01); *H04N 5/37455* (2013.01)

(58) Field of Classification Search
CPC . H04N 5/2175; H04N 3/1556; H04N 3/1568; H04N 5/359; H04N 5/3591; H04N 5/3592; H04N 5/3594; H04N 5/3595; H04N 5/3598; H04N 5/37455
USPC .................... 348/248, 249, 241, 243
See application file for complete search history.

(56) References Cited

U.S. PATENT DOCUMENTS

| | | | |
|---|---|---|---|
| 7,982,785 B2 | 7/2011 | Kinoshita et al. | |
| 8,233,737 B2 | 7/2012 | Takahashi et al. | |
| 2008/0231732 A1* | 9/2008 | Kinoshita et al. | 348/241 |
| 2010/0053383 A1* | 3/2010 | Ichikawa | 348/247 |
| 2010/0110257 A1* | 5/2010 | Hiyama et al. | 348/308 |
| 2011/0025900 A1 | 2/2011 | Kondo | |
| 2012/0147210 A1* | 6/2012 | Miyashita et al. | 348/223.1 |
| 2012/0273655 A1* | 11/2012 | Ise | 250/208.1 |

FOREIGN PATENT DOCUMENTS

| | | |
|---|---|---|
| JP | 2005-130331 | 5/2005 |
| JP | 4329833 | 9/2009 |
| JP | 4396757 | 1/2010 |
| JP | 2011-35689 | 2/2011 |
| KR | 10-2006-0049875 A | 5/2006 |
| KR | 10-2008-0085753 A | 9/2008 |

OTHER PUBLICATIONS

Office Action issued on Feb. 2, 2015 in Korean Patent Application No. 10-2014-0019591 with English translation.

* cited by examiner

*Primary Examiner* — Nhan T Tran
*Assistant Examiner* — Chan Nguyen
(74) *Attorney, Agent, or Firm* — Oblon, McClelland, Maier & Neustadt, L.L.P.

(57) ABSTRACT

According to one embodiment, a streaking correction unit corrects a pixel signal read from an effective pixel portion to reduce streaking in the effective pixel portion on the basis of an evaluation result of a pixel signal read from a vertical light shielded pixel portion and a pixel signal read from a horizontal light shielded pixel portion.

18 Claims, 11 Drawing Sheets

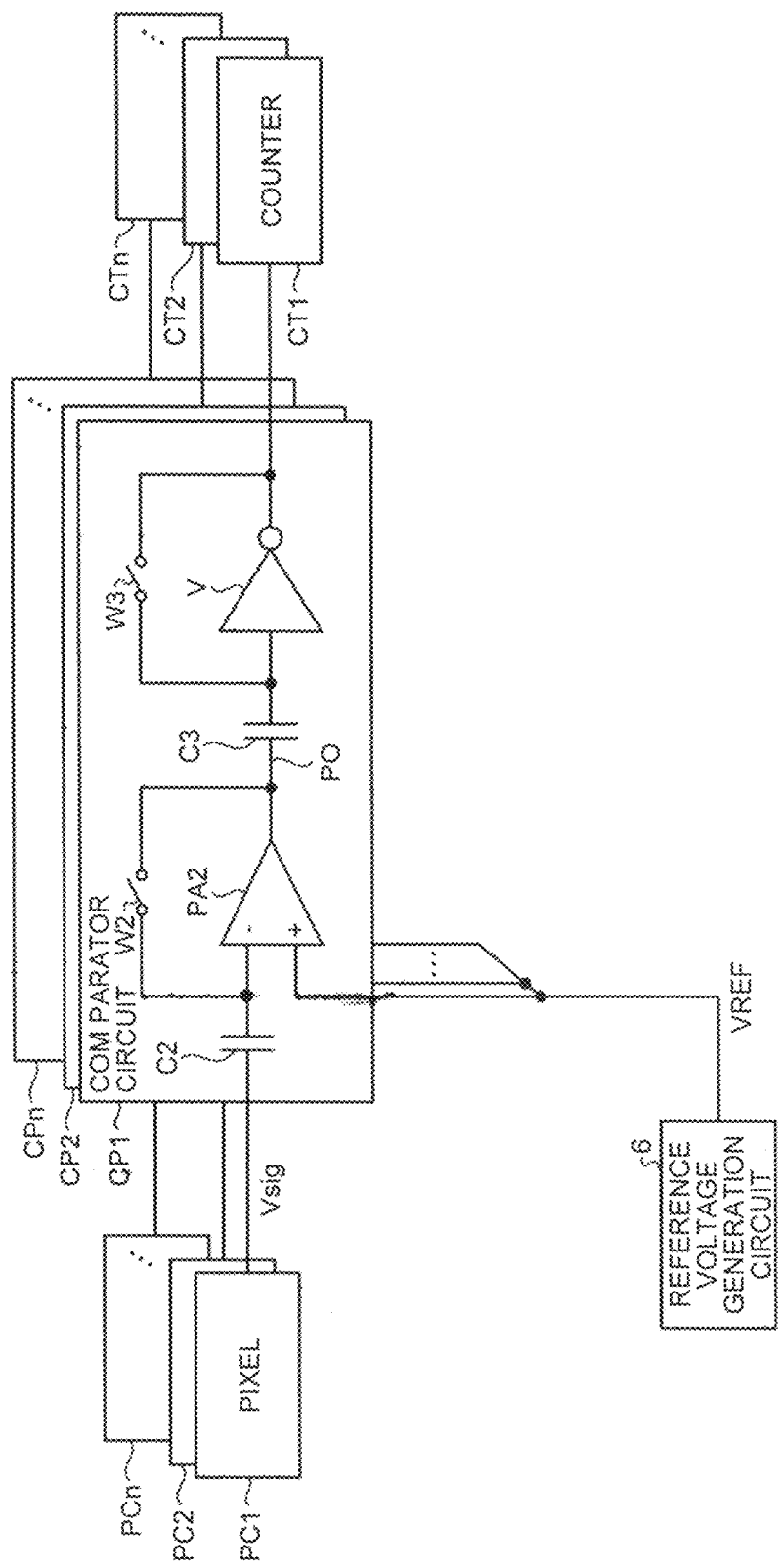

SOLID-STATE IMAGING DEVICE

CROSS-REFERENCE TO RELATED APPLICATIONS

This application is based upon and claims the benefit of priority from Japanese Patent Application No. 2013-219463, filed on Oct. 22, 2013; the entire contents of which are incorporated herein by reference.

FIELD

Embodiments described herein relate generally to a solid-state imaging device.

BACKGROUND

In a CMOS sensor, data is normally read line by line. Therefore, when picking up a relatively dark image such as a night scene, if there is a strong spot light on an object, a streaking occurs in which a portion struck by the spot light leaves a trail in the horizontal direction due to a difference of current variation among columns between a line that is struck by the spot light and a line that is not struck by the spot light.

BRIEF DESCRIPTION OF THE DRAWINGS

FIG. 6 is a circuit diagram illustrating a configuration example of a column ADC circuit in FIG. 4.

DETAILED DESCRIPTION

In general, according to one embodiment, a pixel array portion and a streaking correction unit are provided. The pixel array portion is provided with an effective pixel portion in which effective pixels are arranged in a matrix form, a vertical light shielded pixel portion in which light shielded pixels are arranged in a vertical direction of the effective pixels, and a horizontal light shielded pixel portion in which light shielded pixels are arranged in a horizontal direction of the effective pixels. The streaking correction unit corrects a pixel signal read from the effective pixel portion to reduce streaking in the effective pixel portion on the basis of an evaluation result of a pixel signal read from the vertical light shielded pixel portion and a pixel signal read from the horizontal light shielded pixel portion.

Hereinafter, solid-state imaging devices according to embodiments will be described in detail with reference to the drawings. The present invention is not limited by the embodiments.

First Embodiment

Figure 1:
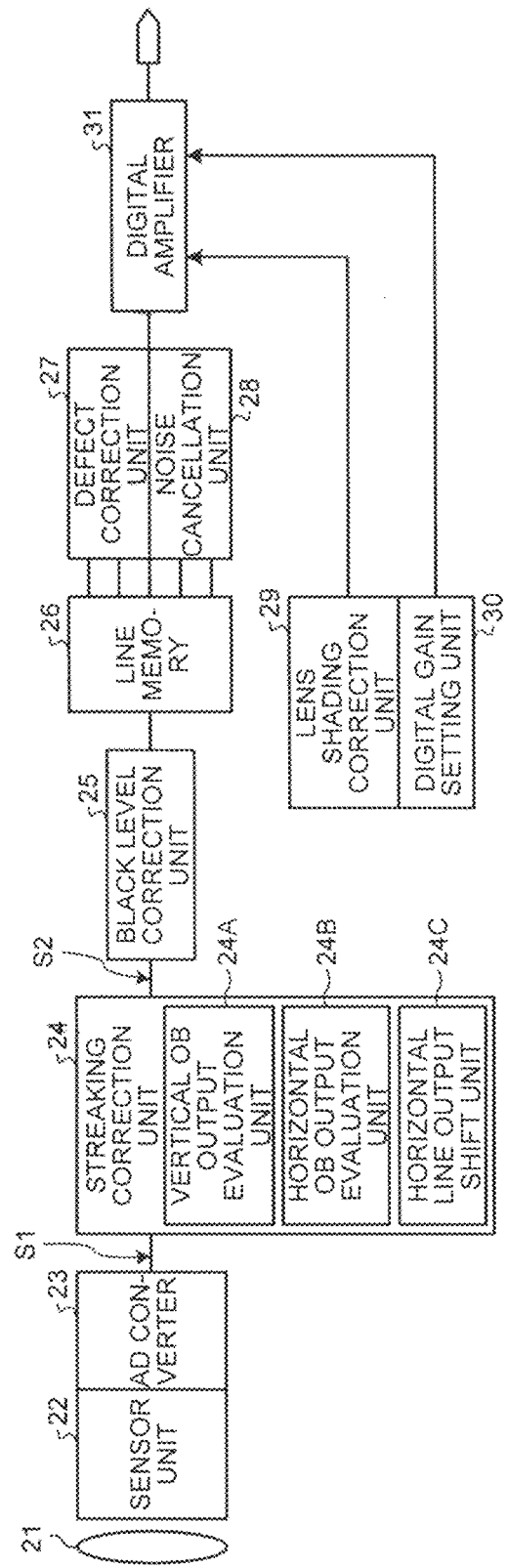
FIG. 1 is a block diagram illustrating a schematic configuration of a solid-state imaging device according to a first embodiment.

FIG. 1 is a block diagram illustrating a schematic configuration of a solid-state imaging device according to a first embodiment.

In FIG. 1, the solid-state imaging device is provided with a sensor unit 22, an AD converter 23, a streaking correction unit 24, a black level correction unit 25, a line memory 26, a defect correction unit 27, a noise cancellation unit 28, a lens shading correction unit 29, a digital gain setting unit 30, and a digital amplifier 31. A lens 21 is provided in front of the sensor unit 22. The sensor unit 22 photoelectric-converts an object for each pixel and generates a pixel signal. In the example in FIG. 1, a case is illustrated in which an image processing unit that performs mosaic processing, γ processing, edge enhancement, YUV conversion, and the like is not included. However, the image processing unit may be included.

Figure 2:
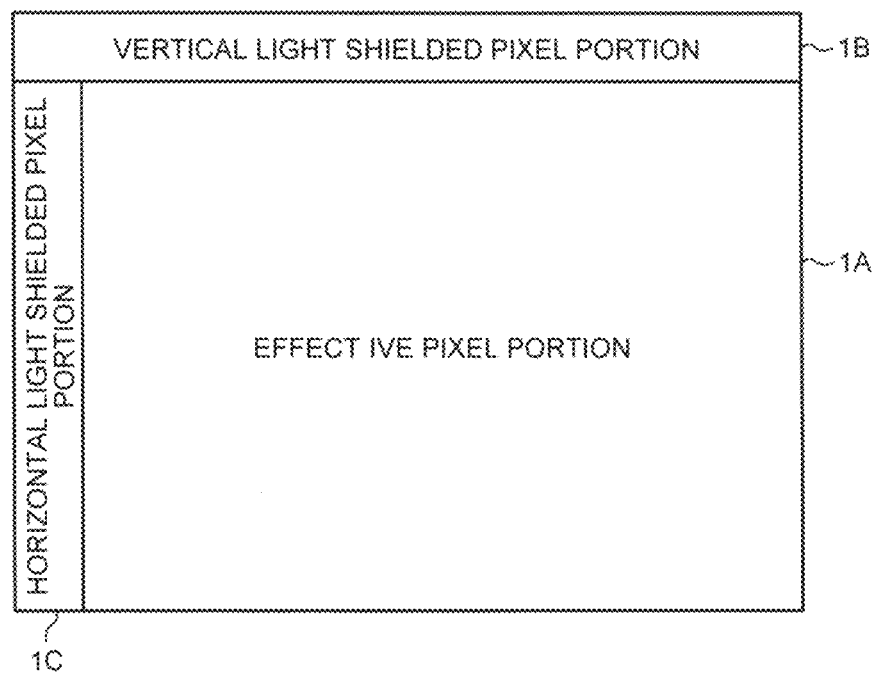
FIG. 2 is a block diagram illustrating an arrangement example of pixels of a sensor unit 22 in FIG. 1.

FIG. 2 is a block diagram illustrating an arrangement example of pixels of the sensor unit 22 in FIG. 1.

In FIG. 2, the sensor unit 22 is provided with an effective pixel portion 1A, a vertical light shielded pixel portion 1B, and a horizontal light shielded pixel portion 1C. In the effective pixel portion 1A, effective pixels are arranged in a matrix form. In the vertical light shielded pixel portion 1B, light shielded pixels are arranged in the vertical direction of the effective pixels. A plurality of lines of light shielded pixels can be arranged in the vertical light shielded pixel portion 1B. In the horizontal light shielded pixel portion 1C, light shielded pixels are arranged in the horizontal direction of the effective pixels. A plurality of columns of light shielded pixels can be arranged in the horizontal light shielded pixel portion 1C.

In FIG. 1, the AD converter 23 converts the pixel signal outputted from the sensor unit 22 into a digital value. The streaking correction unit 24 corrects a pixel signal read from the effective pixel portion 1A so as to reduce streaking in the effective pixel portion 1A on the basis of an evaluation result of a pixel signal read from the vertical light shielded pixel portion 1B and a pixel signal read from the horizontal light shielded pixel portion 1C. Here, the streaking correction unit 24 is provided with a vertical OB output evaluation unit 24A, a horizontal OB output evaluation unit 24B, and a horizontal line output shift unit 24C. The vertical OB output evaluation unit 24A evaluates the pixel signal read from the vertical light shielded pixel portion 1B. The horizontal OB output evaluation unit 24B evaluates the pixel signal read from the horizontal light shielded pixel portion 1C. The horizontal line output shift unit 24C shifts the pixel signal read from the effective pixel portion 1A for each horizontal line on the basis of a comparison result between the pixel signal evaluated by the vertical OB output evaluation unit 24A and the pixel signal evaluated by the horizontal OB output evaluation unit 24B.

Figure 3:
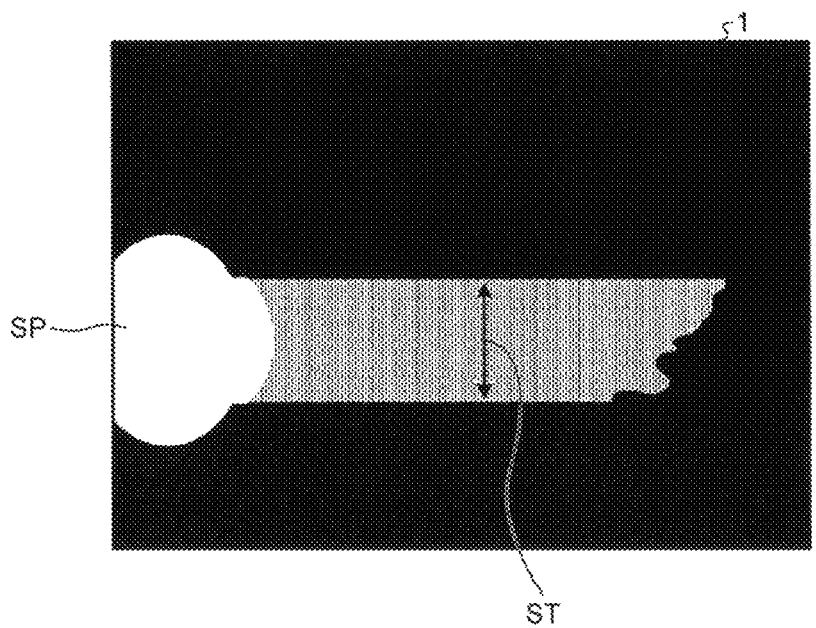
FIG. 3 is a plan view of an example of generation of streaking in the sensor unit 22 in FIG. 1.

FIG. 3 is a plan view of an example of generation of the streaking in the sensor unit 22 in FIG. 1.

In FIG. 3, when picking up a relatively dark image such as a night scene, if a strong spot light SP enters the sensor unit 22, the streaking ST is generated from a portion struck by the spot light SP in the horizontal direction.

In FIG. 1, the black level correction unit 25 corrects a black level of the pixel signal read from the effective pixels on the basis of the pixel signal read from the light shielded pixels. The line memory 26 holds the pixel signal read from the effective pixels for each line. The defect correction unit 27 corrects the pixel signal read from the effective pixels so that a defect of the effective pixels is repaired. The noise cancellation unit 28 performs filtering of the pixel signal read from the effective pixels. The lens shading correction unit 29 compensates attenuation of the amount of light in a peripheral region due to vignetting of the lens 21. The digital gain setting unit 30 adjusts the digital gain of the pixel signal read from the effective pixels. The digital amplifier 31 amplifies the pixel signal read from the effective pixels.

Light enters the sensor unit 22 through the lens 21, so that an image is picked up. At this time, the pixel signals are read from the effective pixels and the light shielded pixels, converted into digital values by the AD converter 23, and then inputted into the streaking correction unit 24 line by line. In the streaking correction unit 24, the pixel signal read from the vertical light shielded pixel portion 1B and the pixel signal read from the horizontal light shielded pixel portion 1C are evaluated and a difference of level between these pixel signals is detected for each line of the horizontal light shielded pixel portion 1C. When the difference of level between the pixel signal read from the vertical light shielded pixel portion 1B and the pixel signal read from the horizontal light shielded pixel portion 1C is greater than a range of variation of the level of the pixel signal read from the vertical light shielded pixel portion 1B, the pixel signal read from the effective pixel portion 1A is corrected for each line by an amount corresponding to the difference.

Here, even if the streaking ST due to the spot light SP in FIG. 3 occurs in the effective pixel portion 1A, the variation of the pixel signal due to the streaking ST does not occur in the vertical light shielded pixel portion 1B. On the other hand, if the streaking ST due to the spot light SP in FIG. 3 occurs in the effective pixel portion 1A, the pixel signal varies due to the streaking ST in the horizontal light shielded pixel portion 1C. At this time, the amount of variation of the pixel signal of the effective pixel portion 1A due to the streaking ST and the amount of variation of the pixel signal of the horizontal light shielded pixel portion 1C due to the streaking ST can be assumed to be the same for each line. Therefore, it is possible to reduce the streaking ST by correcting the pixel signal read from the effective pixel portion 1A for each line by an amount corresponding to the difference of level between the pixel signal read from the vertical light shielded pixel portion 1B and the pixel signal read from the horizontal light shielded pixel portion 1C.

When the pixel signal read from the effective pixel portion 1A is corrected in the streaking correction unit 24, the black level of the pixel signal is corrected in the black level correction unit 25 and the pixel signal is held in the line memory 26. Then, in the defect correction unit 27 and the noise cancellation unit 28, the defect correction and the noise cancellation of the pixel signal read from the effective pixel portion 1A are performed on the basis of the pixel signal held in the line memory 26 and the pixel signal is outputted through the digital amplifier 31.

Figure 4:
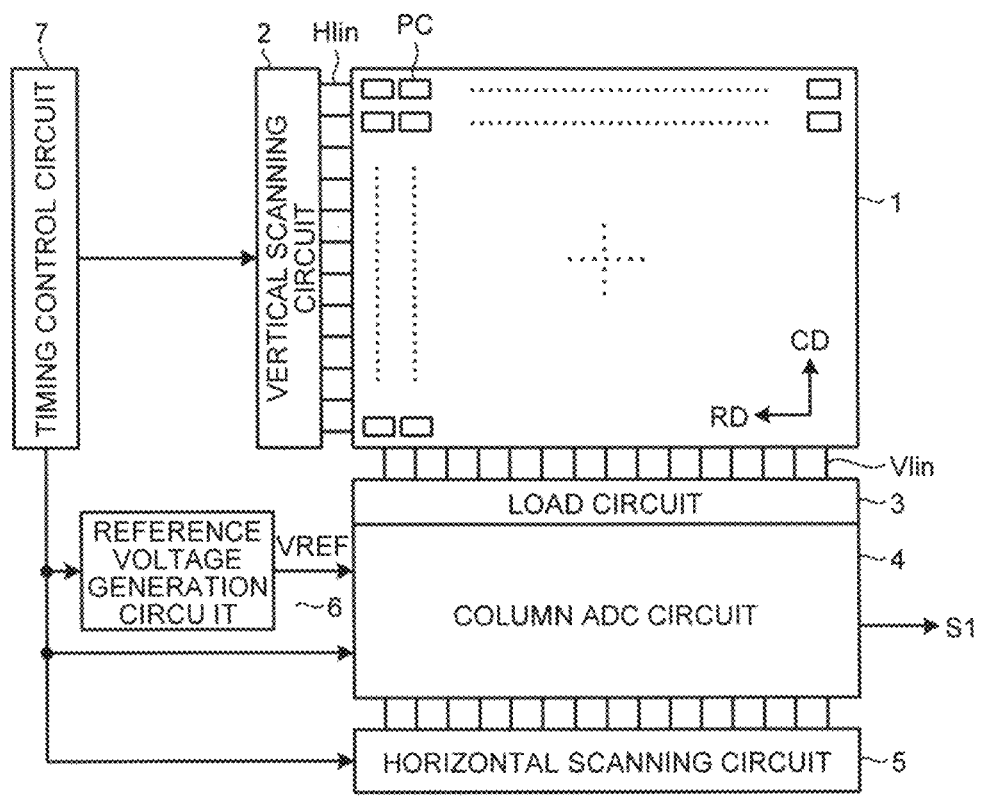
FIG. 4 is a block diagram illustrating a configuration example of the sensor unit and an AD converter in FIG. 1.

FIG. 4 is a block diagram illustrating a configuration example of the sensor unit and the AD converter in FIG. 1.

In FIG. 4, the solid-state imaging device is provided with a pixel array portion 1. In the pixel array portion 1, m (m is a positive integer) rows×n (n is a positive integer) columns of pixels PC that accumulate electric charges obtained by photoelectric conversion are arranged in a row direction RD and a column direction CD in a matrix form. These pixels PC correspond to the effective pixels and the light shielded pixels. Further, in the pixel array portion 1, horizontal control lines Hlin that control reading of the pixels PC are provided in the row direction RD and vertical signal lines Vlin that transfer signals react from the pixels PC are provided in the column direction CD.

Further, the solid-state imaging device is provided with a vertical scanning circuit 2 that scans the pixels PC to be read in the vertical direction, a load circuit 3 that reads the pixel signal from the pixels PC to the vertical signal line Vlin for each column by performing a source follower operation between the load circuit 3 and the pixels PC, a column ADC circuit 4 that detects a signal component of each pixel PC for each column by CDS, a horizontal scanning circuit 5 that transfers the pixel signals read from the pixels PC in the horizontal direction, a reference voltage generation circuit 6 that outputs a reference voltage VREF to the column ADC circuit 4, and a timing control circuit 7 that controls timing of reading and accumulating of each pixel PC. A ramp wave can be used as the reference voltage VREF.

When the pixels PC are scanned in the vertical direction by the vertical scanning circuit 2, the pixels PC are selected in the row direction RD. The source follower operation is performed between the load circuit 3 and these pixels PC, so that the pixel signals read from the pixels PC are transferred through the vertical signal lines Vlin and transmitted to the column ADC circuit 4. In the reference voltage generation circuit 6, a ramp wave is set as the reference voltage VREF and transmitted to the column ADC circuit 4. In the column ADC circuit 4, a clock count operation is performed until a signal level read from the pixels PC and a reset level correspond to the level of the ramp wave, and a difference between the signal level at that time and the reset level is calculated, so that the signal component of each pixel PC is detected by CDS and outputted as an output signal S1.

Figure 5:
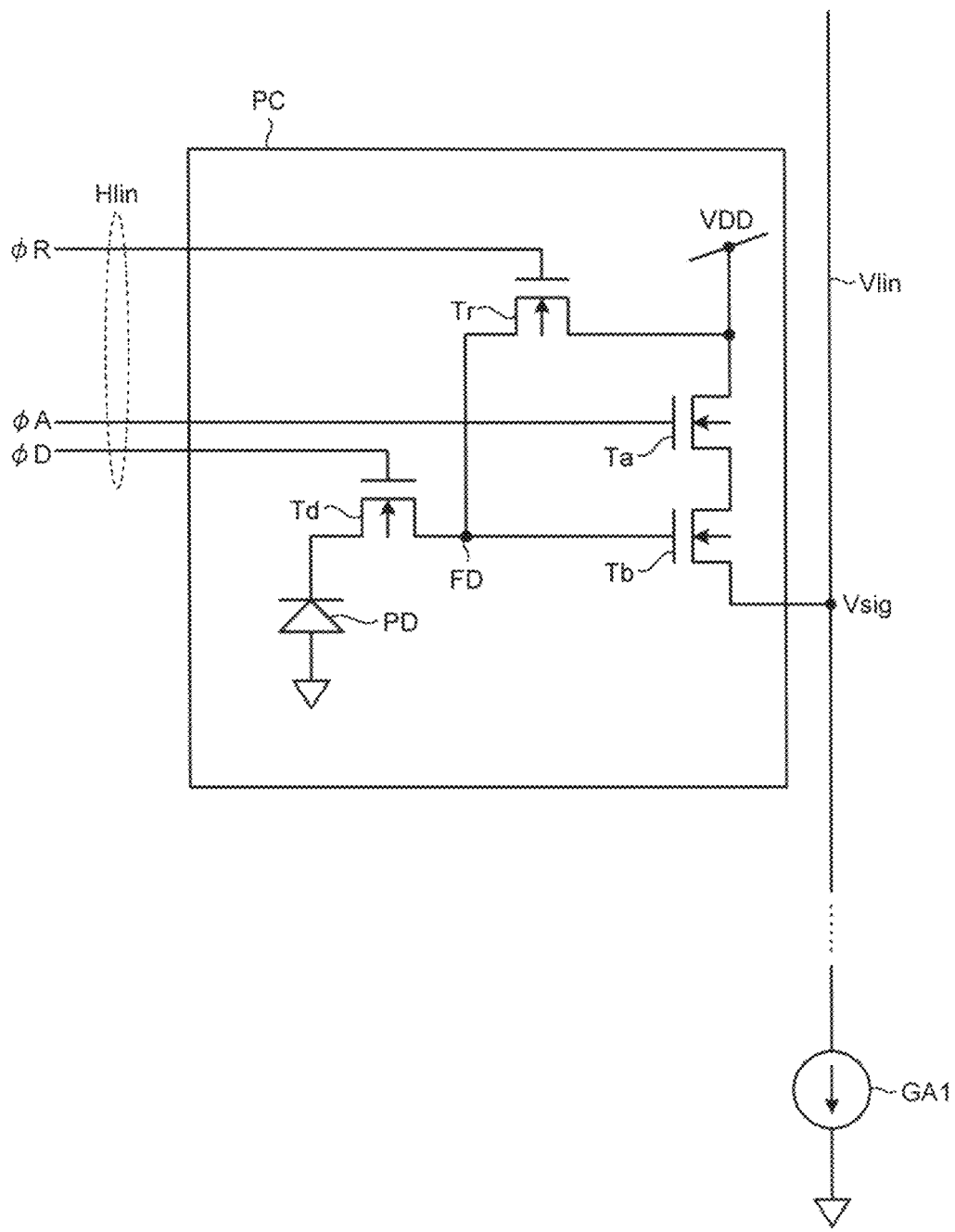
FIG. 5 is a circuit diagram illustrating a configuration example of pixels in FIG. 4.

FIG. 5 is a circuit diagram illustrating a configuration example of the pixels in FIG. 4.

In FIG. 5, each pixel PC is provided with a photodiode PD, a row selection transistor Ta, an amplifier transistor Tb, a reset transistor Tr, and a read-out transistor Td. A floating diffusion FD is formed at the connection point among the amplifier transistor Tb, the reset transistor Tr, and the read-out transistor Td as a detection node.

In the pixel PC, the source of the read-out transistor Td is connected to the photodiode PD and a read-out signal ΦD is inputted into the gate of the read-out transistor Td. The source of the reset transistor Tr is connected to the drain of the read-out transistor Td, a reset signal ΦR is inputted into the gate of the reset transistor Tr, and the drain of the reset transistor Tr is connected to a power supply potential VDD. A row selection signal ΦA is inputted into the gate of the row selection transistor Ta and the drain of the row selection transistor Ta is connected to the power supply potential VDD. The source of the amplifier transistor Tb is connected to the vertical signal line Vlin, the gate of the amplifier transistor Tb is connected to the drain of the read-out transistor Td, and the drain of the amplifier transistor Tb is connected to the source of the row selection transistor Ta. The horizontal control line Hlin in FIG. 4 can transfer the read-out signal ΦD, the reset signal ΦR, and the row selection signal ΦA to the pixels PC for each row. The load circuit 3 in FIG. 4 is provided with a constant current source GA1 for each column and the constant current source GA1 is connected to the vertical signal line Vlin.

FIG. 6 is a circuit diagram illustrating a configuration example of the column ADC circuit in FIG. 4.

In FIG. 6, the column ADC circuit 4 is provided with comparator circuits CP1 to CPn and counters CT1 to CTn for each column. The comparator circuits CP1 to CPn are connected to pixels PC1 to PCn of the first column to the nth column respectively. The comparator circuit CP1 is provided with capacitors C2 and C3, a comparator PA2, switches W2 and W3, and an inverter V.

The vertical signal line Vlin is connected to the inverting input terminal of the comparator PA2 through the capacitor C2, and an output terminal of an operational amplifier PA1 is connected to the non-inverting input terminal of the comparator PA2. The switch W2 is connected between the inverting input terminal and the output terminal of the comparator PA2. The output terminal of the comparator PA2 is connected to the input terminal of the inverter V through the capacitor C3, and the counter CT1 is connected to the output terminal of the inverter V. The switch W3 is connected between the inverting input terminal and the output terminal of the inverter V.

When the row selection signal ΦA becomes high level, the row selection transistor Ta of the pixel PC turns on and the power supply potential VDD is applied to the drain of the amplifier transistor Tb, so that a source follower is formed by the amplifier transistor Tb and the constant current source GA1. Then, a voltage according to a reset level of the floating diffusion FD is applied to the gate of the amplifier transistor Tb. Here, the source follower is formed by the amplifier transistor Tb and the constant current source GA1, so that the voltage of the vertical signal line Vlin follows the voltage applied to the gate of the amplifier transistor Tb and a pixel signal Vsig of a reset level RL is outputted to the column ADC circuit 4 through the vertical signal line Vlin.

When the pixel signal Vsig of the reset level RL is outputted to the vertical signal line Vlin, if a reset pulse φC is applied to the switch W2 and the switch W2 turns on, an input voltage of the inverting input terminal of the comparator PA2 is clamped at the output voltage PO and an operating point is set. At this time, an electric charge according to a voltage difference between the input voltage and the pixel signal Vsig from the vertical signal line Vlin is held by the capacitor C2 and zero setting of the input voltage of the comparator PA2 is performed. When a reset pulse φC is applied to the switch W3 and the switch W3 turns on, an input voltage of the input terminal of the inverter V is clamped at the output voltage and an operating point is set. At this time, an electric charge according to a voltage difference from the output signal from the inverter V is held by the capacitor C3 and zero setting of the input voltage of the inverter V is performed.

After the switches W2 and W3 turn off, in a state in which the pixel signal Vsig of the reset level is inputted into the comparator PA2 through the capacitor C2, a ramp wave is given as the reference voltage VREF, and the pixel signal Vsig of the reset level and the reference voltage VREF are compared. The output voltage PO of the comparator PA2 is inverted by the inverter V and then inputted into the counter CT1.

In the counter CT1, the pixel signal Vsig of the reset level RL is counted down until the pixel signal Vsig of the reset level coincides with the level of the reference voltage VREF, so that the pixel signal Vsig of the reset level is converted into a digital value and held.

Subsequently, when the read-out signal ΦD rises, the read-out transistor Td turns on, an electric charge accumulated in the photodiode PD is transferred to the floating diffusion FD, and a voltage according to the signal level of the floating diffusion FD is applied to the gate of the amplifier transistor Tb. Here, the source follower is formed by the amplifier transistor Tb and the constant current source GA1, so that the voltage of the vertical signal line Vlin follows the voltage applied to the gate of the amplifier transistor Tb and the pixel signal Vsig of a signal level SL is outputted to the column ADC circuit 4 through the vertical signal line Vlin.

In the column ADC circuit 4, in a state in which the pixel signal Vsig of the signal level is inputted into the comparator PA2 through the capacitor C2, a ramp wave is given as the reference voltage VREF, and the pixel signal Vsig of the signal level and the reference voltage VREF are compared. The output voltage PO of the comparator PA2 is inverted by the inverter V and then inputted into the counter CT1.

In the counter CT1, the pixel signal Vsig of the signal level is counted up until the pixel signal Vsig of the signal level coincides with the level of the reference voltage VREF, so that the pixel signal Vsig of the signal level is converted into a digital value. Then, a difference between the pixel signal Vsig of the reset level and the pixel signal Vsig of the signal level is held by the counter CT1 and outputted as the output signal S1.

Here, when noise due to inversion of output of the comparator PA2 of one column is transferred to the comparator PA2 of another column through a common power supply line and a common bias line among columns, the streaking occurs. At this time, the pixel signals of each line are read to the column ADC circuit 4 at the same time, so that a portion struck by the spot light SP leaves a trail in the horizontal direction. Here, there is no effective pixel in the horizontal direction in the vertical light shielded pixel portion 1B, so that the portion struck by the spot light SP does not leave a trail in the horizontal direction and no streaking ST occurs.

On the other hand, the noise due to inversion of output of the comparator PA2 of the one column is transferred not only to the columns of the effective pixel portion 1A but also to the columns of the horizontal light shielded pixel portion 1C. Therefore, between the effective pixel portion 1A and the horizontal light shielded pixel portion 1C, it is possible to assume that the amount of variation of the pixel signal is the same for each line. Therefore, it is possible to obtain the amount of variation of the pixel signal of the effective pixel portion 1A due to the streaking ST by comparing the pixel signal read from the vertical light shielded pixel portion 1B and the pixel signal read from the horizontal light shielded pixel portion 1C.

Figure 7A:
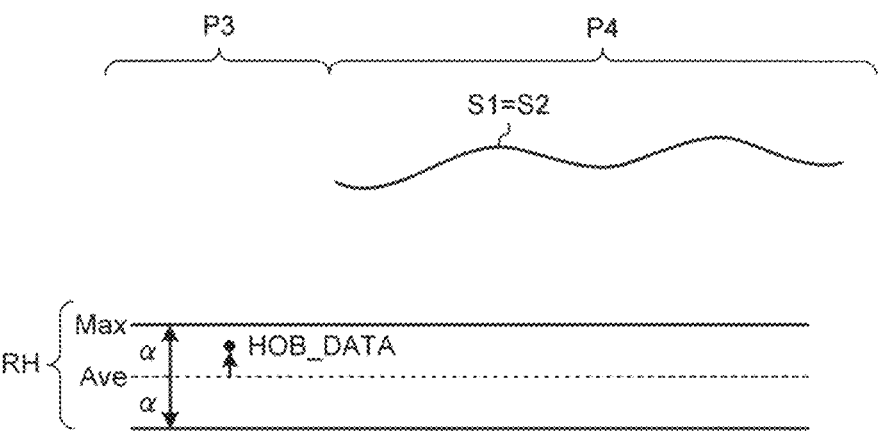
FIGS. 7A and 7B are diagrams illustrating a streaking detection method and a horizontal line output correction method when streaking is detected.
Figure 7B:
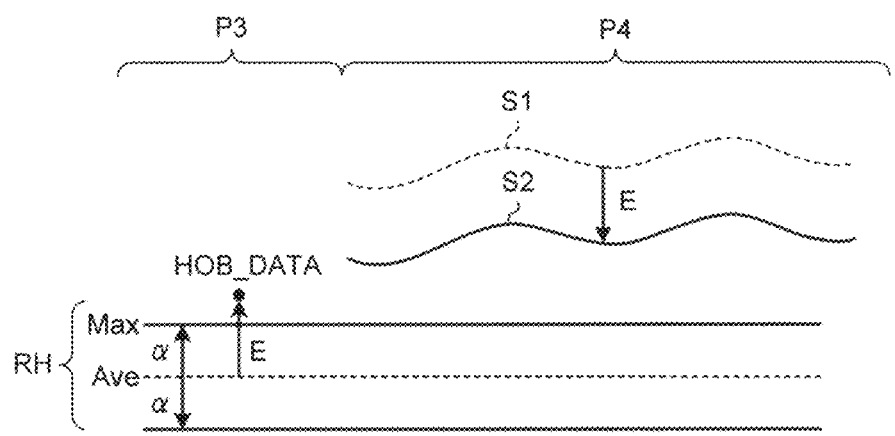

FIGS. 7A and 7B are diagrams illustrating a streaking detection method and a horizontal line output correction method when streaking is detected.

In FIG. 7A, in a VOB (vertical optical black) output period P1, the pixel signals of a plurality of lines are read from the vertical light shielded pixel portion 1B. Then, an average value VOB_DATA of the pixel signals read from the vertical light shielded pixel portion 1B is calculated for each line. Further, an average value Ave of the pixel signals of a plurality of lines read from the vertical light shielded pixel portion 1B is calculated. Further, the average value VOB_DATA of the pixel signals of a line whose difference from the average value Ave is the greatest is extracted as a maximum value Max and a difference between the maximum value Max and the average value Ave is set as a maximum difference amount α. Further, a range which is smaller than a value obtained by adding the maximum difference amount α to the average value Ave and greater than a value obtained by subtracting the maximum difference amount α from the average value Ave is set as a limited range RH used when the streaking correction unit 24 performs correction.

In an HOB (horizontal optical black) output period P3, the pixel signals are read from the horizontal light shielded pixel portion 1C for each line. Then, an average value HOB_DATA of the pixel signals read from the horizontal light shielded pixel portion 1C is calculated for each line.

In a horizontal effective pixel output period P4, the pixel signals of one line are read from the effective pixel portion 1A. When the average value HOB_DATA is within the limited range RH, the streaking correction unit 24 outputs the output signal S1 of the effective pixel portion 1A as an output signal S2 without correcting the output signal S1 of the effective pixel portion 1A.

On the other hand, in FIG. 7B, when the average value HOB_DATA is out of the limited range RH, the streaking correction unit 24 generates the output signal S2 of the effective pixel portion 1A by correcting the output signal S1 of the effective pixel portion 1A. At this time, the streaking correction unit 24 can sets a difference between the average value HOB_DATA and the average value Ave as a correction value E. The streaking correction unit 24 can generate the output signal S2 of the effective pixel portion 1A by shifting the output signal S1 of the effective pixel portion 1A by the correction value E.

Figure 8:
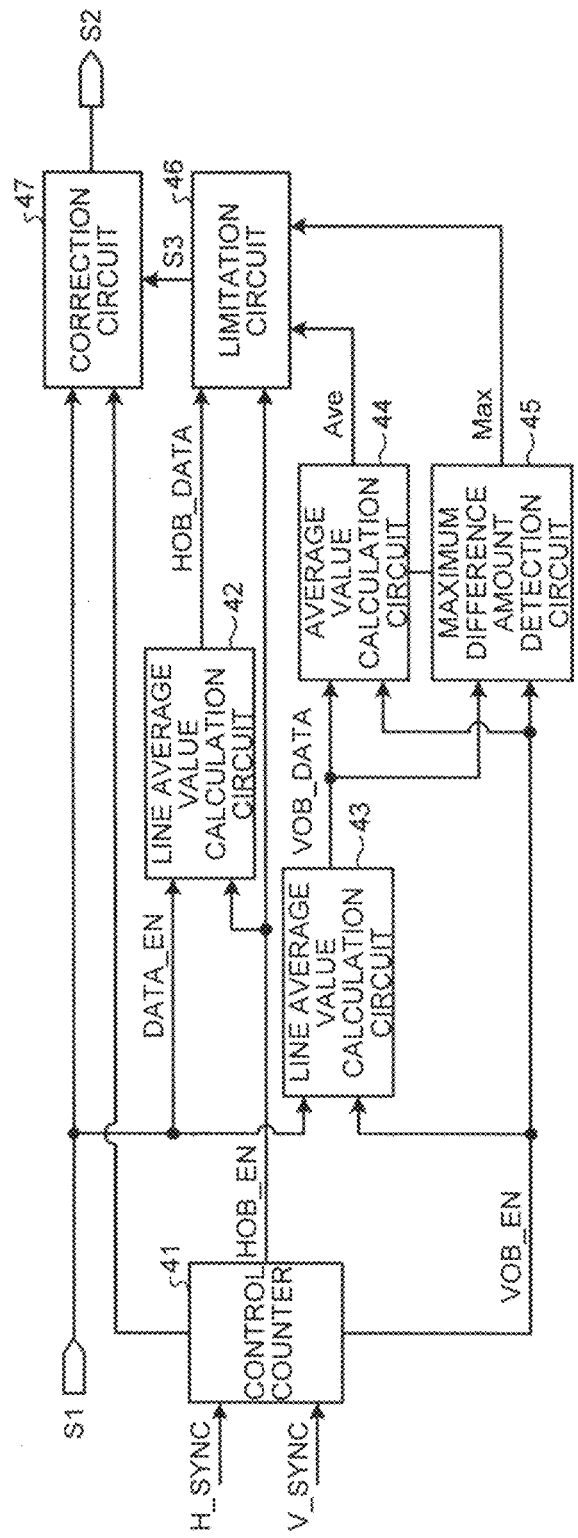
FIG. 8 is a block diagram illustrating a configuration example of a streaking correction unit 24 in FIG. 1.

FIG. 8 is a block diagram illustrating a configuration example of the streaking correction unit 24 in FIG. 1.

In FIG. 8, the streaking correction unit 24 is provided with a control counter 41, line average value calculation circuits 42 and 43, an average value calculation circuit 44, a maximum difference amount detection circuit 45, a limitation circuit 46, and a correction circuit 47.

A vertical synchronization signal V_SYNC and a horizontal synchronization signal H_SYNC are inputted into the control counter 41 and the control counter 41 outputs a data enable signal DATA_EN, a horizontal OB enable signal HOB_EN, and a vertical OB enable signal VOB_EN. Here, the data enable signal DATA_EN is supplied to the correction circuit 47, the horizontal OB enable signal HOB_EN is supplied to the line average value calculation circuit 42 and the limitation circuit 46, and the vertical OB enable signal VOB_EN is supplied to the line average value calculation circuit 43, the average value calculation circuit 44, and the maximum difference amount detection circuit 45. The line average value calculation circuit 42 calculates the average value HOB_DATA of the pixel signals read from the horizontal light shielded pixel portion 1C for each line. The line average value calculation circuit 43 calculates the average value VOB_DATA of the pixel signals read from the vertical light shielded pixel portion 1B for each line. The average value calculation circuit 44 calculates the average value Ave of a plurality of lines on the basis of the average value VOB_DATA for each line calculated by the line average value calculation circuit 43. The maximum difference amount detection circuit 45 detects the maximum difference amount α of the pixel signals read from the vertical light shielded pixel portion 1B on the basis of the average value VOB_DATA of a line whose difference from the average value Ave calculated by the average value calculation circuit 44 is the greatest. The limitation circuit 46 limits the correction by the streaking correction unit 24 on the basis of a determination result whether or not the average value HOB_DATA for each line calculated by the line average value calculation circuit 42 is within a range set based on the maximum difference amount α. When the limitation circuit 46 does not limit the correction, the correction circuit 47 corrects the pixel signals read from the effective pixel portion 1A.

Here, it is possible to prevent the streaking correction unit 24 from malfunctioning due to variation of the pixel signals from the light shielded pixels by limiting the correction of the correction circuit 47 by the limitation circuit 46.

Figure 9A:
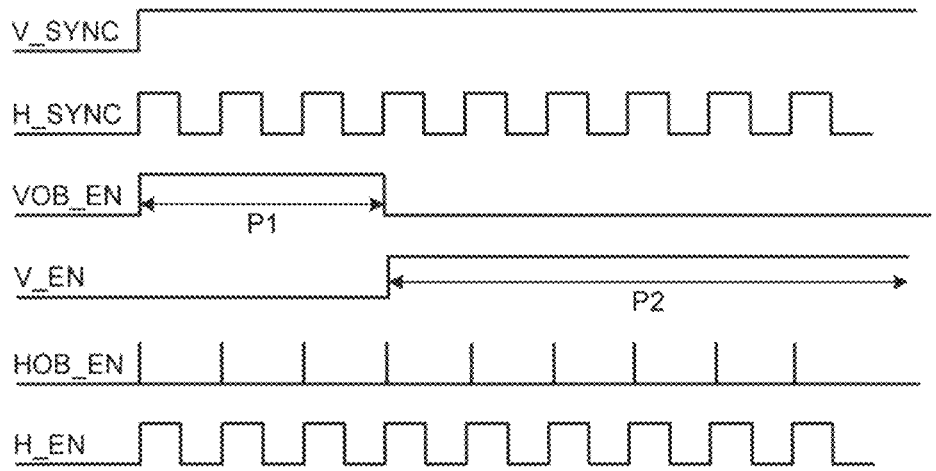
FIG. 9A is a timing chart illustrating an operation of the streaking correction unit 24 in FIG. 8.
Figure 9B:
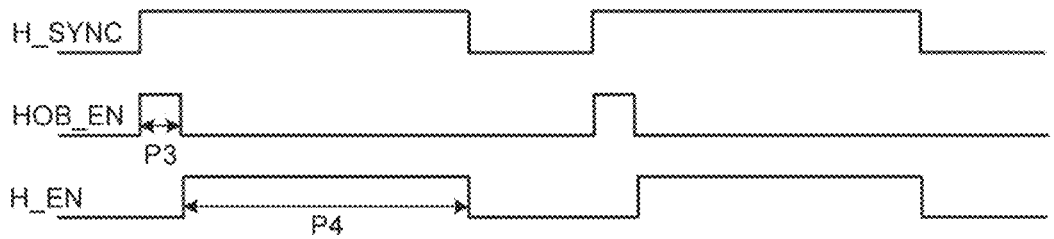
FIG. 9B is a timing chart enlarging and illustrating a horizontal synchronization signal H_SYNC, a horizontal OB enable signal HOB_EN, and an effective pixel enable signal H_EN in FIG. 9A.

FIG. 9A is a timing chart illustrating an operation of the streaking correction unit 24 in FIG. 8. FIG. 9B is a timing chart enlarging and illustrating a horizontal synchronization signal H_SYNC, a horizontal OB enable signal HOB_EN, and a horizontal effective pixel enable signal H_EN in FIG. 9A.

In FIGS. 9A and 9b, a vertical OB enable signal VOB_EN and a vertical effective pixel enable signal V_EN are set according to the vertical synchronization signal V_SYNC. Further, a horizontal OB enable signal HOB_EN and a horizontal effective pixel enable signal H_EN are set according to the horizontal synchronization signal H_SYNC.

Further, a VOB output period P1 is set based on the vertical OB enable signal VOB_EN, a vertical effective pixel output period P2 is set based on the vertical effective pixel enable signal V_EN, an HOB output period P3 is set based on the horizontal OB enable signal HOB_EN, and a horizontal effective pixel output period P4 is set based on the horizontal effective pixel enable signal H_EN.

Here, the output signal S1 is inputted into the line average value calculation circuits 42 and 43 and the correction circuit 47. When the vertical OB enable signal VOB_EN is high level, the average value VOB_DATA of the pixel signals read from the vertical light shielded pixel portion 1B is calculated for each line in the line average value calculation circuit 43 and outputted to the average value calculation circuit 44 and the maximum difference amount detection circuit 45. In the average value calculation circuit 44, the average value Ave of a plurality of lines is calculated based on the average value VOB_DATA and outputted to the limitation circuit 46. In the maximum difference amount detection circuit 45, the average value VOB_DATA of a line whose difference from the average value Ave is the greatest is extracted as the maximum value Max and outputted to the limitation circuit 46.

When the horizontal OP enable signal HOB_EN is high level, in the line average value calculation circuit 42, the average value HOB_DATA of the pixel signals read from the horizontal light shielded pixel portion 1C is calculated for each line and outputted to the limitation circuit 46. In the limitation circuit 46, a difference between the maximum value Max and the average value Ave is set as the maximum difference amount α and a range which is smaller than a value obtained by adding the maximum difference amount α to the average value Ave and greater than a value obtained by subtracting the maximum difference amount α from the average value Ave is set as the limited range RH. Then, it is determined whether or not the average value HOB_DATA is within the limited range RH, and when the average value HOB_DATA is out of the limited range RH, a correction instruction signal S3 is outputted to the correction circuit 47.

When the horizontal effective pixel enable signal H_EN is high level, if the correction instruction signal S3 is outputted to the correction circuit 47, the output signal S1 of the effective pixel portion 1A is corrected, so that the output signal S2 is generated. The horizontal effective pixel enable signal H_EN can be included in the data enable signal DATA_EN.

Figure 10:
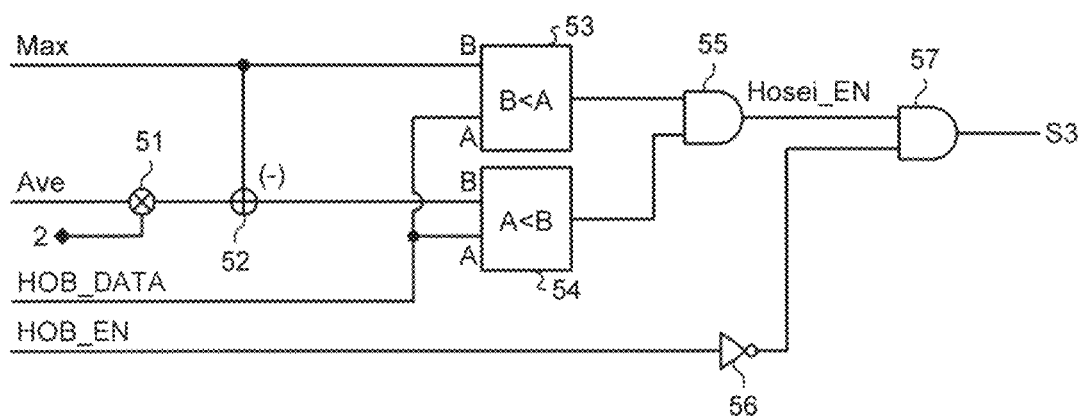
FIG. 10 is a block diagram illustrating a configuration example of a limitation circuit 46 in FIG. 8.

FIG. 10 is a block diagram illustrating a configuration example of the limitation circuit 46 in FIG. 8.

In FIG. 10, the limitation circuit 46 is provided with a multiplier 51, a subtracter 52, comparators 53 and 54, AND circuits 55 and 57, and an inverter 56. In the comparator 53, the maximum value Max and the average value HOB_DATA are compared, and if the average value HOB_DATA is greater than the maximum value Max, a high level signal is outputted to the AND circuit 55.

In the multiplier 51, the average value Ave is multiplied by 2. Thereafter, in the subtracter 52, the maximum value Max is subtracted from the value obtained by multiplying the average value Ave by 2 and the subtraction result is outputted to the comparator 54. In the comparator 54, the output of the subtracter 52 and the average value HOB_DATA are compared, and if the average value HOB_DATA is smaller than the output of the subtracter 52, a high level signal is outputted to the AND circuit 55.

When both outputs of the comparators 53 and 54 are high level, an output Hosei_EN of the AND circuit 55 becomes high level and outputted to the AND circuit 57. Further, the horizontal OB enable signal HOB_EN is inverted by the inverter 56 and outputted to the AND circuit 57. When the horizontal OB enable signal HOB_EN is low level and the output Hosei_EN of the AND circuit 55 is high level, the output of the AND circuit 57 becomes high level and is outputted as the correction instruction signal S3.

Figure 11:
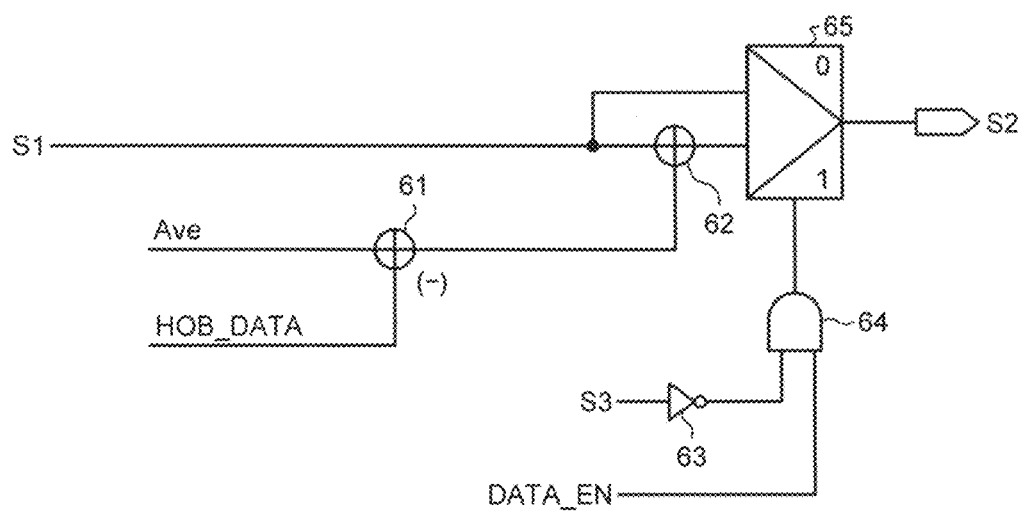
FIG. 11 is a block diagram illustrating a configuration example of a correction circuit 47 in FIG. 8.

FIG. 11 is a block diagram illustrating a configuration example of the correction circuit 47 in FIG. 8.

In FIG. 11, the correction circuit 47 is provided with a subtracter 61, an adder 62, an inverter 63, an AND circuit 64, and a selector 65. The output signal S1 is inputted into the selector 65. In the subtracter 61, the average value HOB_DATA is subtracted from the average value Ave. Thereafter, in the adder 62, the output signal S1 is added to the output of the subtracter 61 and the addition result is inputted into the selector 65.

The correction instruction signal S3 is inverted by the inverter 63 and inputted into the AND circuit 64, and the data enable signal DATA_EN is inputted into the AND circuit 64. The selector 65 is switched based on the output of the AND circuit 64. At this time, if the data enable signal DATA_EN is high level and the correction instruction signal S3 is high level, the output of the adder 62 is selected by the selector 65 and outputted as the output signal S2. Otherwise, the output signal S1 is selected by the selector 65 and outputted as the output signal S2.

In the configuration of FIG. 11, a difference between the average value HOB_DATA and the average value Ave is set as the correction value E of the streaking correction unit 24.

Figure 12:
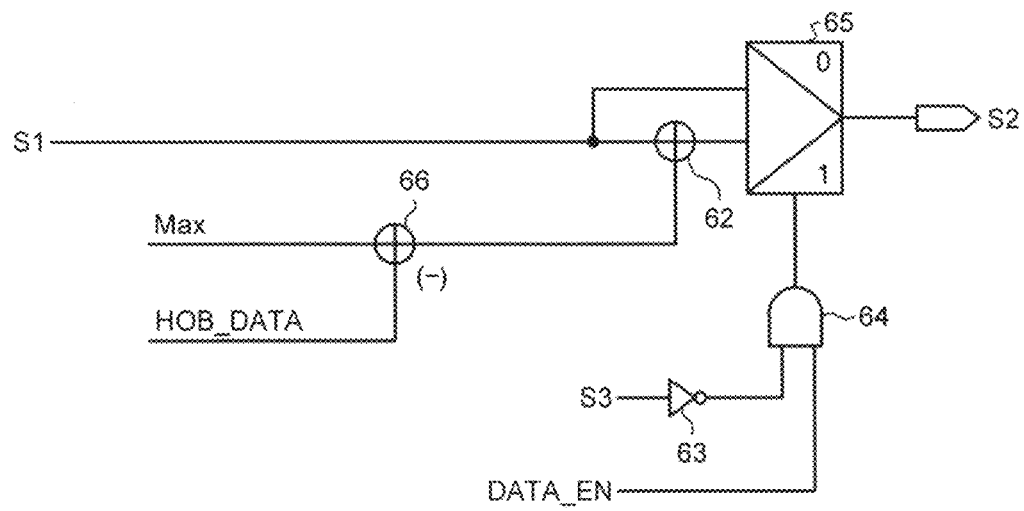
FIG. 12 is a block diagram illustrating another configuration example of the correction circuit 47 in FIG. 8.

FIG. 12 is a block diagram illustrating another configuration example of the correction circuit 47 in FIG. 8.

In FIG. 12, the correction circuit 47 is provided with a subtracter 66 instead of the subtracter 61 in FIG. 11. Here, in the subtracter 66, the average value HOB_DATA is subtracted from the maximum value Max. Thereafter, in the adder 62, the output signal S1 is added to the output of the subtracter 66 and the addition result is inputted into the selector 65.

In the configuration of FIG. 12, a difference between the average value HOB_DATA and the maximum value Max is set as the correction value E of the streaking correction unit 24.

Second Embodiment

Figure 13:
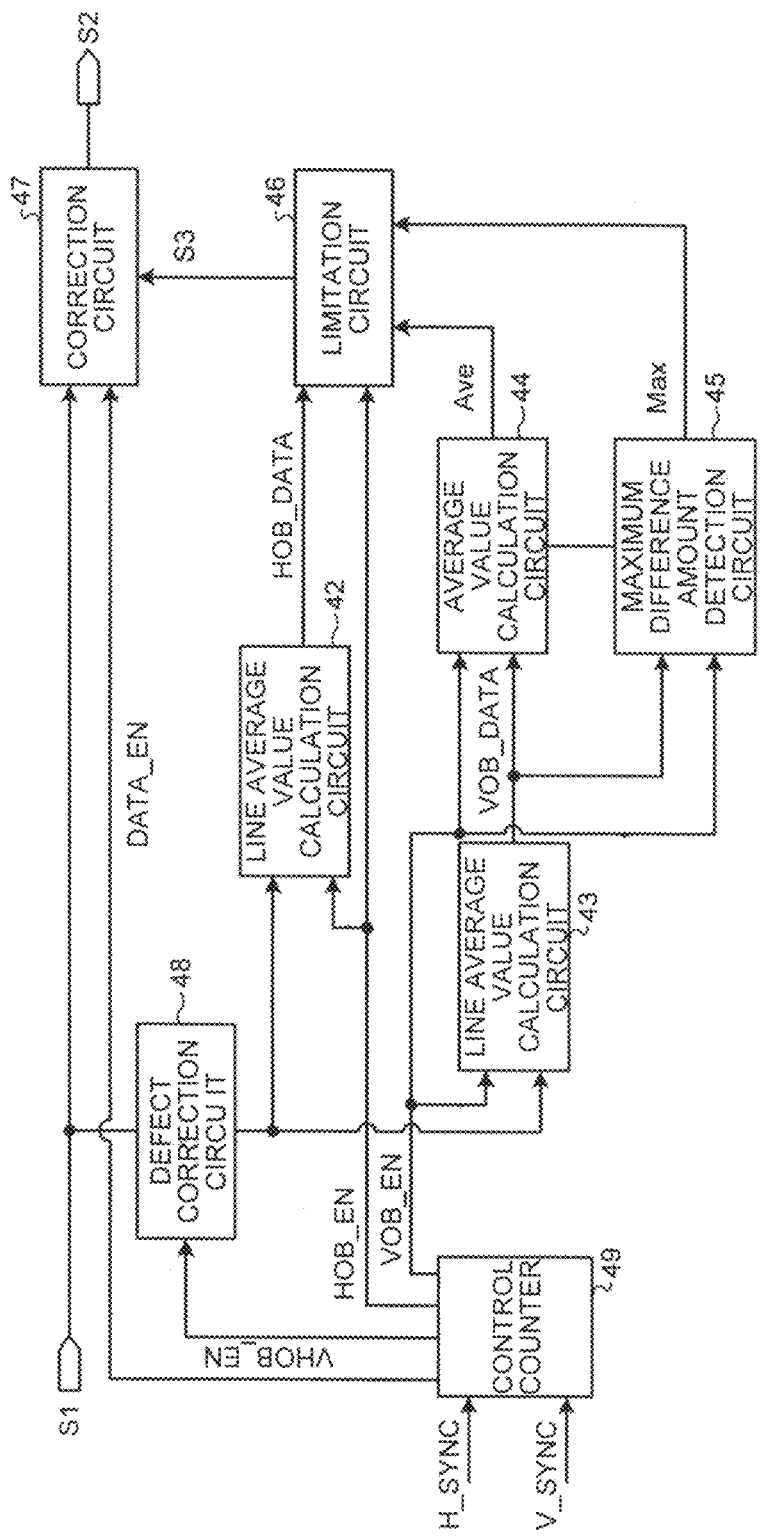
FIG. 13 is a block diagram illustrating a schematic configuration of a streaking correction unit applied to a solid-state imaging device according to a second embodiment.

FIG. 13 is a block diagram illustrating a schematic configuration of a streaking correction unit applied to a solid-state imaging device according to a second embodiment.

In FIG. 13, in this configuration, a defect correction circuit 48 is provided in addition to the configuration of FIG. 8 and a control counter 49 is provided instead of the control counter 41. The defect correction circuit 48 corrects the pixel signals read from the light shielded pixels so that defects of the light shielded pixels in the vertical light shielded pixel portion 1B and the horizontal light shielded pixel portion 1C are repaired. The control counter 49 outputs a vertical horizontal OB enable signal VHOB_EN in addition to performing the operation of the control counter 41. The vertical horizontal OB enable signal VHOB_EN is supplied to the defect correction circuit 48. Here, it is possible to provide the defect correction circuit 48 at a front stage of the line average value calculation circuits 42 and 43.

In the defect correction circuit 48, when the vertical horizontal OB enable signal VHOB_EN is high level, the output signal S1 is corrected and outputted to the line average value calculation circuits 42 and 43. As a defect correction method of the defect correction circuit 48, for example, it is determined whether or not a value of a center pixel of an area of 3×3 pixels in the vertical light shielded pixel portion 1B or the horizontal light shielded pixel portion 1C exceeds a threshold value. When the value of the center pixel exceeds the threshold value, the center pixel is assumed to be a defect and the value of the center pixel can be replaced by a maximum value of peripheral pixels.

Here, by providing the defect correction circuit 48 at a front stage of the line average value calculation circuits 42 and 43, it is possible to improve the calculation accuracy of the line average value calculation circuits 42 and 43, so that it is possible to improve the correction accuracy of streaking.

Third Embodiment

Figure 14:
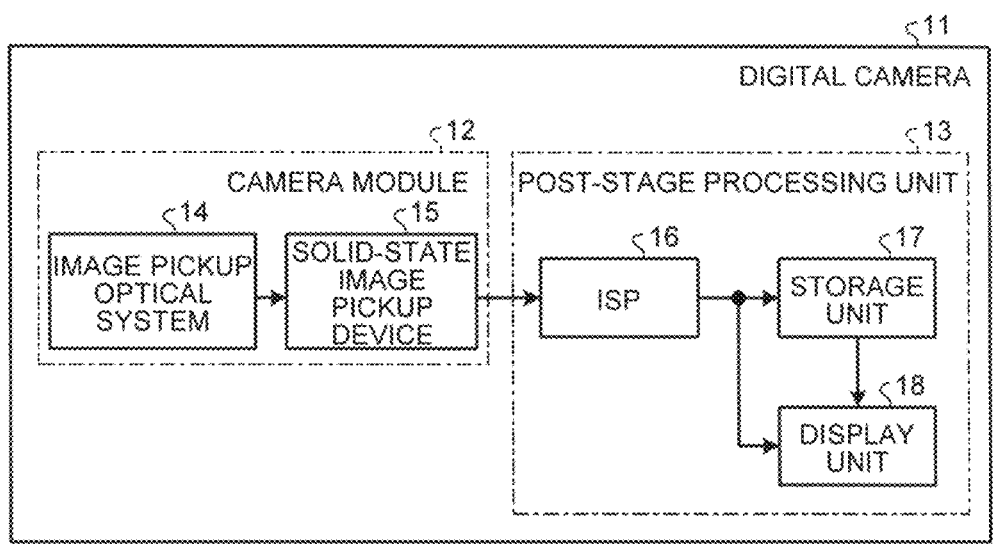
FIG. 14 is a block diagram illustrating a schematic configuration of a digital camera to which a solid-state imaging device according to a third embodiment is applied.

FIG. 14 is a block diagram illustrating a schematic configuration of a digital camera to which a solid-state imaging device according to a third embodiment is applied.

In FIG. 14, a digital camera 11 includes a camera module 12 and a post-stage processing unit 13. The camera module 12 includes an image pickup optical system 14 and a solid-state imaging device 15. The post-stage processing unit 13 includes an image signal processor (ISP) 16, a storage unit 17, and a display unit 18. The streaking correction unit may be provided in the solid-state imaging device 15 or may be provided in the image signal processor 16. At least a part of configuration of the ISP 16 may be integrated into one chip along with the solid-state imaging device 15.

The image pickup optical system 14 takes in light from an object and forms an object image. The solid-state imaging device 15 picks up an image of the object. The ISP 16 performs signal processing on an image signal obtained by the image pickup of the solid-state imaging device 15. The storage unit 17 stores an image obtained by the signal processing of the ISP 16. The storage unit 17 outputs an image signal to the display unit 18 according to an operation of a user or the like. The display unit 18 displays an image according to the image signal inputted from the ISP 16 or the storage unit 17. The display unit 18 is, for example, a liquid crystal display. The camera module 12 may be applied to an electronic device such as, for example, a mobile terminal with a camera in addition to the digital camera 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   a pixel array portion including an effective pixel portion in which effective pixels are arranged in a matrix form, a vertical light shielded pixel portion in which light shielded pixels are arranged in a vertical direction of the effective pixels, and a horizontal light shielded pixel portion in which light shielded pixels are arranged in a horizontal direction of the effective pixels; and
   a streaking correction unit configured to correct a pixel signal read from the effective pixel portion on the basis of an evaluation result of a pixel signal read from the vertical light shielded pixel portion and a pixel signal read from the horizontal light shielded pixel portion, wherein
   the streaking correction unit includes
      a first line average value calculation circuit configured to calculate an average value of pixel signals read from the vertical light shielded pixel portion for each line,
      an average value calculation circuit configured to calculate an average value of a plurality of lines on the basis of the average value for each line calculated by the first line average value calculation circuit,
      a maximum difference amount detection circuit configured to detect a maximum difference amount of the pixel signals read from the vertical light shielded pixel portion on the basis of an average value of a line whose difference from the average value calculated by the average value calculation circuit is the greatest,
      a second line average value calculation circuit configured to calculate an average value of pixel signals read from the horizontal light shielded pixel portion for each line,
      a limitation circuit configured to limit correction by the streaking correction unit on the basis of a determination result whether or not the average value for each line calculated by the second line average value calculation circuit is within a range set based on the maximum difference amount, and
      a correction circuit configured to correct the pixel signal read from the effective pixel portion when the limitation circuit does not limit the correction.

2. A solid-state imaging device according to claim 1, wherein
   the streaking correction unit includes
      a vertical OB output evaluation unit configured to evaluate the pixel signal read from the vertical light shielded pixel portion,
      a horizontal OB output evaluation unit configured to evaluate the pixel signal read from the horizontal light shielded pixel portion, and
      a horizontal line output shift unit configured to shift the pixel signal read from the effective pixel portion for each horizontal line on the basis of a comparison result between the pixel signal evaluated by the vertical OB output evaluation unit and the pixel signal evaluated by the horizontal OB output evaluation unit.

3. A solid-state imaging device according to claim 1, wherein an amount of variation of the pixel signal of the effective pixel portion due to the streaking and an amount of variation of the pixel signal of the horizontal light shielded pixel portion due to the streaking are the same for each line.

4. A solid-state imaging device according to claim 1, wherein
   the streaking correction unit includes
      a defect correction circuit configured to correct the pixel signal read from the light shielded pixels so that a defect of the light shielded pixels is repaired.

5. A solid-state imaging device according to claim 1, wherein the correction circuit corrects the pixel signal read from the effective pixel portion for each line on the basis of a difference between the average value of pixel signals read from the horizontal light shielded pixel portion and the average value of pixel signals read from the vertical light shielded pixel portion.

6. A solid-state imaging device according to claim 1, wherein the correction circuit corrects the pixel signal read from the effective pixel portion for each line on the basis of a difference between the average value of pixel signals read from the horizontal light shielded pixel portion and a maximum value of pixel signals read from the vertical light shielded pixel portion.

7. A solid-state imaging device according to claim 1, wherein the limitation circuit sets a range, which is smaller than a value obtained by adding the maximum difference amount to the average value for each line calculated by the second line average value calculation circuit and greater than a value obtained by subtracting the maximum difference amount from the average value for each line calculated by the second line average value calculation circuit, as a limited range.

8. A solid-state imaging device according to claim 1, further comprising: a control counter into which a vertical synchronization signal and a horizontal synchronization signal are inputted and which outputs a data enable signal, a horizontal OB enable signal, and a vertical OB enable signal.

9. A solid-state imaging device according to claim 8, wherein the correction circuit operates based on the data enable signal, the second line average value calculation circuit and the limitation circuit operate based on the horizontal OB enable signal, and the first line average value calculation circuit, the average value calculation circuit, and the maximum difference amount detection circuit operate based on the vertical OB enable signal.

10. A solid-state imaging device according to claim 8, wherein
    the streaking correction unit includes
       a defect correction circuit configured to correct the pixel signal read from the light shielded pixels so that a defect of the light shielded pixels is repaired.

11. A solid-state imaging device according to claim 10, wherein the defect correction circuit is provided at a front stage of the first line average value calculation circuit and the second line average value calculation circuit.

12. A solid-state imaging device according to claim 11, wherein the correction circuit operates based on the horizontal OB enable signal and the vertical OB enable signal.

13. A solid-state imaging device according to claim 1, further comprising:
    a reference voltage generation circuit configured to generate a reference voltage; and
    a column ADC circuit configured to calculate an AD conversion value of a pixel signal read from the effective pixels or the light shielded pixels for each column on the basis of a comparison result between the pixel signal and the reference voltage.

14. A solid-state imaging device according to claim 13, further comprising:
- a vertical signal line configured to transfer the pixel signal for each column;
- a vertical scanning circuit configured to scan the pixels in a vertical direction;
- a load circuit configured to read the pixel signal from the pixels to the vertical signal line for each column by performing a source follower operation between the load circuit and the pixels; and
- a horizontal scanning circuit configured to scan the pixels in a horizontal direction.

15. A solid-state imaging device according to claim 14, wherein the column ADC circuit obtaining a difference between an AD conversion value of a reset level and an AD conversion value of a signal level.

16. A solid-state imaging device according to claim 15, wherein
the column ADC circuit includes
- a comparator circuit configured to compare the pixel signal read from the pixel and the reference voltage, and
- a counter configured to perform a count operation until the pixel signal becomes equal to a level of the reference voltage.

17. A solid-state imaging device according to claim 16, wherein
the comparator circuit includes
a comparator,
a switch, and
- a capacitor configured to perform analog sampling by holding electric charge corresponding to the pixel signal for each column, and
- an inverting input terminal of the comparator is connected to the vertical signal line through the capacitor, the switch is connected between the inverting input terminal and the output terminal of the comparator, and the reference voltage is inputted into a non-inverting input terminal of the comparator.

18. A solid-state imaging device according to claim 1, wherein
the effective pixel and the light shielded pixel include
- a photodiode configured to perform photoelectric conversion,
- a read-out transistor configured to transfer a signal from the photodiode to a floating diffusion,
- a reset transistor configured to reset a signal accumulated in the floating diffusion, and
- an amplifier transistor configured to detect a potential of the floating diffusion.

* * * * *